3,424,681
CORROSION INHIBITION
James R. Stanford, Houston, Tex., assignor to Nalco Chemical Company, Chicago, Ill., a corporation of Delaware
No Drawing. Filed Nov. 3, 1965, Ser. No. 506,262
U.S. Cl. 252—8.55       11 Claims
Int. Cl. C23f 9/02

ABSTRACT OF THE DISCLOSURE

Corrosion inhibiting compositions for flooding waters which are blends of (a) 90–20% of the reaction product of an organic amine and an aliphatic monohydric alcohol-epichlorohydrin reaction product; (b) 10–80% of a polyoxyalkylated (oxyethylene or both oxyethylene and oxypropylene) organic carboxylic acid having 8–36 carbons and 1–2 carboxyl groups and (c) 1–10% of free fatty acids having 8–36 carbon atoms.

---

This invention in general relates to water soluble or water dispersible corrosion inhibitors for inhibiting corrosion of ferrous metals, and more particularly relates to corrosion inhibiting chemicals derived by the reaction of epichlorohydrin and an aliphatic, saturated, straight or branch chain alcohol and then by the reaction of the resultant reaction product with a primary, secondary or tertiary amine. The invention further pertains to chemical blends of said corrosion inhibiting chemicals with polyoxylated compounds and free fatty acids which enhance the corrosion inhibiting properties of the compositions.

Water flooding of subterranean formations is employed extensively in secondary recovery of oil. The waters available at the flooding sites are often far from ideal from a ferrous metal corrosion viewpoint. For example, water containing acids or hydrogen sulfide and corrosive salts, commonly called sour water or brine, is recovered in many oil-bearing locales from water wells or from oil wells along with the oil. In offshore wells such as are found off the coasts of Louisiana and Texas, sea water is used for flooding.

As used hereinafter, sour waters are those waters containing appreciable amounts of hydrogen sulfide, e.g., at least 1 p.p.m., and sweet water are those waters lacking in appreciable quantities of hydrogen sulfide and also substantially free from dissolved molecular oxygen ($O_2$).

This invention is directed primarily toward the provision of corrosion inhibiting chemicals and/or compositions which inhibit the corrosion of ferrous metal pipes, pumps, tanks, etc., which are used in subterranean water flooding and oil recovery operations, by ferrous metal-corrosive waters encountered therein, e.g., the aforesaid sour and sweet water or brines.

A primary object of the invention is to provide improvements in chemicals and compositions which, when added in corrosion-inhibiting quantities to ferrous metal-corrosive waters, protect ferrous metals against corrosion thereby.

Another object of the invention is to provide new chemicals derived by the reaction of aliphatic, straight or branch chain alcohols with epichlorohydrin and then by the reaction of the resultant product with a primary, secondary or tertiary amine to form a different amine or a quaternary ammonium salt.

Another important object is to provide compositions of chemicals of the character aforedescribed, a polyoxyalkylated organic acid, preferably polyoxyalkylated tall oil, and free fatty acids to improve corrosion-inhibiting efficacy on ferrous metals in contact with water, especially sweet waters or brines, sea water essentially free from dissolved molecular oxygen, or with mildly sour waters or brines.

The chemicals and compositions of the invention have several properties which are especially desirable for inhibition of corrosion of ferrous metals by sour waters and/or sweet waters. They exhibit high levels of corrosion inhibition in sour produced brines, sea water as aforesaid and other sweet or sour waters. They have good water solubility or water dispersibility in fresh water, low chloride brines and high brines.

The epichlorohydrin and the aliphatic alcohol are reacted in the presence of an acidic catalyst such as $BF_3$ etherate, stannic chloride or aluminum chloride in an exothermic reaction at a temperature below the boiling point of epichlorohydrin. The aliphatic alcohol may be any straight or branch chain, saturated or olefinically unsaturated monohydric alcohol having about 6–24 carbons. Preferably, the alcohol is a primary alcohol. The epichlorohydrin is added slowly to the alcohol and reacted therewith at a mol ratio of epichlorohydrin to alcohol of about 1:1 to about 5:1. The reaction product has the structural formula:

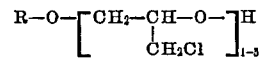

wherein R is the residue of the alcohol, e.g., an aliphatic, saturated or olefinically unsaturated hydrocarbon group.

The above reaction product is then reacted with a primary, secondary or tertiary amine. The amine may be a monoalkyl amine, dialkyl amine or trialkyl amine having 1–12 carbons per alkyl group, an alkylene diamine having 2–12 carbons in the alkylene group, a polyalkylene polyamine having 2–6 carbon alkylene groups and two to ten or more alkylene groups per molecule, a heterocyclic amine compound, or relatively high molecular weight aromatic amines such as quinoline. Amine compositions, usually mixtures of amines of the character aforesaid, may be used in practice of the invention.

Often amine compounds which are residues or by-products are more economical than the more pure amine compounds. These residues or by-products may be complex mixtures. Examples thereof include bottoms from the distillation of triethylene diamine, morpholine bottoms, piperazine bottoms, etc.

The alcohol-epichlorohydrin reaction product and amine are reacted at about 150–400° F., e.g., at atmospheric pressure at temperatures in the order of 150–200° C. or in a pressure vessel at superatmospheric pressure in the order of 20–50 p.s.i.g. at about 150–400° F.

The epichlorohydrin-alcohol reaction product and the amine are reacted at about a ratio of one nitrogen amino group per chloro group of the epichlorohydrin-alcohol reaction product. The reaction of a primary amine yields a secondary amine reaction product. A secondary amine initial reactant gives a tertiary amine reaction product. A tertiary amine initial reactant gives a quaternary ammonium reaction product.

The resultant products are added to water in amounts in the order of 5–50 p.p.m., preferably about 10–25 p.p.m. They are rendered considerably more effective in corrosion inhibition properties by blending therewith a polyoxyalkylated organic acid such as polyoxyethylated tall oil acids, which comprise a mixture of rosin acids and fatty acids, and also a small amount of free fatty acids having 8–36 carbons.

For blends of the alcohol-epichlorohydrin-amine reaction product and the polyoxyalkylated organic acid, the general relative proportions of the two compounds are about 90–20% of said reaction product and about 10–80% of said polyoxyalkylated organic acid. More preferably, the respective percentages are about 50–20% and 50–80% respectively.

Blends of the aforesaid reaction product, polyoxyalkylated organic acid and free fatty acids are proportioned, based on the three ingredients, as follows:

|  | General, percent | Preferred, percent |
|---|---|---|
| Reaction product | 89–20 | 48–18 |
| Polyoxyalkylated organic acid | 10–80 | 50–80 |
| Free fatty acid | 1–10 | 2–10 |

Embodiments of the invention are illustrated in the following examples.

EXAMPLE 1

Four hundred grams of tridecyl alcohol and 4 cc. of BF$_3$-ether complex were heated together in a three-necked flask equipped with a stirrer, thermometer, and addition funnel. When the temperature reached 50° C., the source of external heat was removed and 380 grams epichlorohydrin was added slowly.

This reaction is exothermic. The addition required two hours in order to hold the temperature of the reaction mass below 90° C. When the entire 380 grams epichlorohydrin was added, the temperature was maintained between 80° C. and 90° C. by the use of external heat for an additional 30 minutes to yield the finished intermediate. This product's structural formula is shown below:

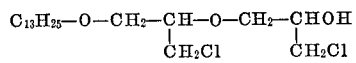

Any number of alcohols can be used in this reaction as well as various moles of epichlorohydrin. Table I shows a number of alcohols with various amounts of epichlorohydrin which have been successfully employed as corrosion inhibitor intermediates.

The reaction of the intermediates in Table I with various amines was then employed to give products which are water soluble or highly water dispersible and good corrosion inhibitors.

EXAMPLE 2

An example of the reaction of the product of Example 1 with an organic amine is:

One hundred grams of the product of Example 1 and 110 grams of Houdry Amine CNC 10, an amine bottoms residue from distillation of triethylene diamine, were added together in a three-necked flask equipped with a thermometer, heater, and condenser and heated slowly while stirring between 170° C. and 180° C. and held at this temperature for one hour. The reaction mass was then cooled and 110 grams of water added to yield a finished corrosion inhibitor.

Another method of reacting the epichlorohydrin adducts with amines is by the use of a pressure vessel. In this type of reaction on a laboratory scale the reactants, i.e., epichlorohydrin adduct, amine and solvent are weighed together in the pressure bottle and capped, and mounted on a revolving wheel in a heated oven for a number of hours to achieve reaction.

A number of amines and various ratios of amines to the epichlorohydrin addition product can be made. Table II gives some examples.

TABLE I

| No. | Alcohols | (Gm.) | BF$_3$ Cat., cc. | Epichlorohydrin (Gm.) |
|---|---|---|---|---|
| A | C-13 | 348 | 4 | 290 |
| B | C-13 | 348 | 4 | 380 |
| C | C-13 | 400 | 4 | 180 |
| D | C-13 | 400 | 4 | 380 |
| E | C-13 | 400 | 5 | 570 |
| F | C-13 | 200 | 4 | 360 |
| G | C-13 | 200 | 4 | 450 |
| H | Alfol 1618C | 280 | 3 | 285 |
| I | Alfol 810 | 145 | 1 | 95 |
| J | do | 290 | 1 | 270 |
| K | Alfol 1618C | 280 | 3 | 380 |
| L | do | 147 | 2 | 53 |
| M | do | 280 | 3 | 100 |
| N | do | 280 | 3 | 200 |
| O | Alfol 1216 | 985 | 10 | 475 |
| P | Alfol 1618C | 762 | 10 | 285 |
| Q | Alfol C-20+ | 365 | 5 | 95 |
| R | do | 365 | 5 | 180 |
| S | Alfol 610 | 270 | 2 | 190 |
| T | Alfol 810 | 440 | 4 | 285 |
| U | Alfol 1214 | 390 | 5 | 190 |
| V | Alfol 1218 | 210 | 3 | 95 |
| W | do | 210 | 3 | 210 |
| X | do | 418 | 6 | 190 |
| Y | do | 418 | 6 | 360 |

In the above table, C-13 is tridecyl alcohol. The Alfols are mixtures of aliphatic alcohols with about 6–10 carbons (Alfol 610); with about 8–10 carbons (Alfol 810); with about 12–18 carbons (Alfol 1218); with about 16–18 carbons (Alfol 1618C); and with about twenty and more carbons (Alfol C-20+).

TABLE II

| No. | Epichlorohydrin Addition Product (gm.) | Amine (gm.) | Temperature | Time | Type Flask |
|---|---|---|---|---|---|
| 1 | A, 64 | 25% Trimethylamine (48) | 160° F. | 15 hours | Pressure. |
| 2 | A, 64 | Diethylene triamine (20) | 160 | do | Do. |
| 3 | A, 64 | Diethylene triamine (10) | 160 | do | Do. |
| 4 | A, 64 | Houdry Amine Residue (30) | 160 | do | Do. |
| 5 | A, 64 | Dipropylene triamine (15) | 160 | do | Do. |
| 6 | B, 38 | 25% Trimethylamine (48) | 160 | do | Do. |
| 7 | B, 38 | 25% Trimethylamine (24) | 160 | do | Do. |
| 8 | B, 38 | 40% Dimethylamine (12) | 160 | do | Do. |
| 9 | B, 38 | 40% Dimethylamine (24) | 160 | do | Do. |
| 10 | B, 90 | Houdry Amine Distillate CNC-10 (40) | 180–190° C. | 30 minutes | 3-necked. |
| 11 | B, 90 | Houdry Amine Distillate CNC-10 (60) | 180–190 | do | Do. |
| 12 | A, 70 | Houdry Amine Distillate CNC-10 (70) | 180–190 | do | Do. |
| 13 | B, 90 | Houdry Amine Distillate CNC 10 (90) | 180–190 | do | Do. |
| 14 | A, 70 | Houdry Amine Distillate CNC-10 (90) | 180–190 | do | Do. |
| 15 | A, 70 | Houdry Amine Distillate CNC-10 (50) | 180–190 | do | Do. |
| 16 | B, 90 | Houdry Amine Distillate CNC-10 (110) | 180–190 | do | Do. |
| 17 | A, 109 | Dipropylene Triamine Heavies (70) | 180–190 | do | Do. |
| 18 | A, 109 | Dipropylene Triamine Heavies (45) | 180–190 | do | Do. |
| 19 | B, 90 | Houdry Amine Distillate CNC-10 (140) | 180–190 | do | Do. |
| 20 | B, 90 | Houdry Amine Distillate CNC-10 (120) | 180–190 | do | Do. |
| 21 | C, 145 | Houdry Amine Distillate CNC-10 (110) | 180–190 | do | Do. |
| 22 | D, 113 | Houdry Amine Distillate CNC-10 (110) | 180–190 | do | Do. |
| 23 | E, 162 | Houdry Amine Distillate CNC-10 (220) | 180–190 | do | Do. |
| 24 | F, 90 | Houdry Amine Distillate CNC-10 (110) | 180–190 | do | Do. |
| 25 | G, 90 | Houdry Amine Distillate CNC-10 (110) | 170° C. | 15 minutes | Do. |
| 26 | F, 70 | Houdry Amine Distillate CNC-10 (110) | 170–180° C. | 30 minutes | Do. |
| 27 | G, 65 | Houdry Amine Distillate CNC-10 (110) | 170–180 | do | Do. |
| 28 | C, 145 | Houdry Amine Distillate CNC-10 (55) | 170–180 | do | Do. |
| 29 | G, 65 | Houdry Amine Distillate CNC-10 (110) | 170–180 | do | Do. |
| 30 | D, 113 | Houdry Amine Distillate CNC-10 (110) | 170–180 | do | Do. |
| 31 | D, 50 | 25% Trimethylamine (40) | 160° F. | 15 hours | Pressure. |
| 32 | D, 50 | 25% Trimethylamine (20) | 160° F. | do | Do. |
| 33 | D, 50 | Houdry Amine Distillate CNC-10 (40) | 160° F. | do | Do. |
| 34 | H, 94 | Houdry Amine Distillate CNC-10 (110) | 160–170° C. | 30 minutes | 3-necked. |
| 35 | D, 200 | Diethylene Triamine (100) | 170–180° C. | do | Do. |
| 36 | D, 200 | Dipropylene Triamine (130) | 170–180° C. | do | Do. |
| 37 | D, 200 | Amine AL-1 (130) | 170–180° C. | do | Do. |
| 38 | D, 200 | Houdry Amine Residue (125) | 170–180° C. | do | Do. |
| 39 | D, 100 | do | 170–180° C. | do | Do. |
| 40 | D, 100 | Houdry Amine Residue (50) | 170–180° C. | do | Do. |

TABLE II—Continued

| No. | Epichlorohydrin Addition Product (gm.) | Amine (gm.) | Temperature | Time | Type Flask |
|---|---|---|---|---|---|
| 41 | D, 100 | Houdry Amine Residue (75) | 170–180° C. | 30 minutes | 3-necked. |
| 42 | D, 100 | Houdry Amine Residue (175) | 170–180° C. | do | Do. |
| 43 | H (94) | Dipropylene triamine (65) | 160–170° C. | do | Do. |
| 44 | H (94), D (100) | Dipropylene triamine (130) | 160–180° C. | do | Do. |
| 45 | H (50), D (50) | Houdry Amine Distillate CNC-10 (110) | 160–170° C. | do | Do. |
| 46 | H (50), D (50) | Houdry Amine Residue (150) | 160–170° C. | do | Do. |
| 47 | J (91) | Dipropylene triamine (65) | 160–180° C. | do | Do. |
| 48 | K, 165 | Dipropylene triamine (130) | (¹) | | |
| 49 | K, 33 | 40% Dimethylamine (28) | 200° F. | 24 hours | Pressure. |
| 50 | J, 93 | Houdry Amine Residue (125) | 180–190° C. | 30 minutes | 3-necked. |
| 51 | J, 93 | Houdry Amine Residue (150) | 180–190° C. | do | Do. |
| 52 | J, 93 | do | 100–105° C. | 4 hours | Do. |
| 53 | M, 190 | do | 180–190° C. | 30 minutes | Do. |
| 54 | N, 240 | do | 180–190° C. | do | Do. |
| 55 | J, 93 | Houdry Amine Residue (250) | 180° C. | do | Do. |
| 56 | D (50), N (50) | Houdry Amine Residue (150) | 170–175° C. | do | Do. |
| 57 | D (50), N (75) | do | 170–175° C. | do | Do. |
| 58 | D (25), N (50) | Houdry Amine Residue (75) | 170–180° C. | do | Do. |
| 59 | D (50) | Polyamine H (10) | 160° F. | 62 hours | Pressure. |
| 60 | D (50) | Polyamine H (15) | 160° F. | do | Do. |
| 61 | D (50) | Polyamine H (20) | 160° F. | do | Do. |
| 62 | D (100) | Polyamine H (50) | 180° C. | 15 minutes | 3-necked. |
| 63 | O (94) | Polyamine H Solid (20) | 160–170° C. | 30 minutes | Do. |
| 64 | O (94) | Polyamine H Solid (40) | 170–180° C. | do | Do. |
| 65 | O (94) | Polyamine H Solid (60) | 170–180° C. | do | Do. |
| 66 | O (94) | Polyamine H Solid (80) | 170–180° C. | do | Do. |
| 67 | O (94) | Polyamine H Solid (100) | 170–180° C. | do | Do. |
| 68 | Q (153) | Polyamine H Solid (80) | 170–180° C. | do | Do. |
| 69 | Q (153) | Polyamine H Solid (100) | 170–180° C. | do | Do. |
| 70 | O (58) | 25% Trimethylamine (47) | 160° F. | 16 hours | Pressure. |
| 71 | O (58) | 40% Dimethylamine (23) | 160° F. | do | Do. |
| 72 | P (70) | do | 160° F. | do | Do. |
| 73 | P (70) | 25% Trimethylamine (47) | 160° F. | do | Do. |
| 74 | Q (92) | do | 160° F. | do | Do. |
| 75 | Q (92) | 40% Dimethylamine (23) | 160° F. | do | Do. |
| 76 | R (55) | 25% Trimethylamine (47) | 160° F. | do | Do. |
| 77 | R (55) | 40% Dimethylamine (23) | 160° F. | do | Do. |
| 78 | S (115) | Polyamine H Solid (150) | 170–190° C. | 30 minutes | 3-necked. |
| 79 | T (121) | do | 170–190° C. | do | Do. |
| 80 | U (145) | do | 170–190° C. | do | Do. |
| 81 | R (136) | do | 170–190° C. | do | Do. |
| 82 | S (46) | 25% Trimethylamine (47) | 160° F. | 15 hours | Pressure. |
| 83 | T (48) | do | 160° F. | do | Do. |
| 84 | U (58) | do | 160° F. | do | Do. |
| 85 | D (100) | Houdry Amine Residue (120) | 160–170° C. | 1 hour | 3-necked. |
| 86 | D (100) | Houdry Amine Residue (160) | 170–180° C. | 45 minutes | Do. |
| 87 | O (29), S (23) | Dimethylamine (23) Caustic (4) | 160° F. | 14 hours | Pressure. |
| 88 | O (29), P (35) | do | 160° F. | do | Do. |
| 89 | P (97), S (56) | Houdry Amine Residue (160) | 170–180° C. | 30 minutes | 3-necked. |
| 90 | O (73), S (56) | do | 170–180° C. | do | Do. |
| 91 | T (120) | Polyamine H Solid (30) | 160–170° C. | do | Do. |
| 92 | D (100) | Houdry Amine Residue (160) | 180–190° C. | do | Do. |
| 93 | D (100) | do | 140–150° C. | do | Do. |
| 94 | D (100) | do | 150–160° C. | 1 hour | Do. |
| 95 | D (100) | do | 170–180° C. | do | Do. |
| 96 | D (100) | do | 150–160° C. | 2 hours | Do. |
| 97 | D (40) | Houdry Amine Residue (64) | 350° F. | 16 hours | Pressure. |
| 98 | U (30) | 25% Trimethylamine (24) | 160° F. | do | Do. |
| 99 | W (42) | 25% Trimethylamine (48) | 160° F. | do | Do. |
| 100 | W (100) | Houdry Amine Residue (160) | 160–170° C. | 1 hour | 3-necked. |
| 101 | X (75) | Houdry Amine Residue (80) | 160–170° C. | do | Do. |
| 102 | X (75) | Houdry Amine Residue (100) | 160–170° C. | do | Do. |
| 103 | Y (98) | Houdry Amine Residue (125) | 160–170° C. | do | Do. |
| 104 | Y (98) | Houdry Amine Residue (150) | 160–170° C. | do | Do. |
| 105 | X (75) | Trimethylamine (25%) (60) | 160° F. | 14 hours | Pressure. |
| 106 | Y (49) | do | 160° F. | do | Do. |
| 107 | X (75) | Dimethylamine (40%) (14) Caustic (10) | 160° F. | do | Do. |
| 108 | Y (98) | Houdry Amine Residue (160) | 160–170° C. | 1 hour | 3-necked. |
| 109 | Y (98) | Houdry Amine Residue (170) | 160–170° C. | do | Do. |
| 110 | Y (98) | Houdry Amine Residue (180) | 160–170° C. | do | Do. |
| 111 | X (75) | Houdry Amine Residue (60) | 160–170° C. | do | Do. |
| 112 | Y (98) | Houdry Amine Residue (140) | 160–170° C. | do | Do. |
| 113 | Y (98) | Houdry Amine Residue (160) | 160–170° C. | do | Do. |
| 114 | Y (98) | Pyridine Residue (150) | (²) | 2 hours | Do. |
| 115 | Y (98) | Pyridine Residue (140) | (²) | do | Do. |
| 116 | Y (98) | Pyridine Residue (130) | (²) | do | Do. |
| 117 | Y (98) | Pyridine Residue (120) | (²) | do | Do. |
| 118 | Y (98) | Houdry Amine Residue (170) | 160–170° C. | 30 minutes | Do. |
| 119 | Y (98) | Houdry Amine Residue (180) | 160–170° C. | do | Do. |
| 120 | Y (98) | Houdry Amine Residue (190) | 160–170° C. | do | Do. |

¹ Rubber at 170° C.
² Reflux.

The following tables provide the results of laboratory corrosion tests sandblasted with mild steel test samples with sour brine and sweet brine.

This test evaluates the corrosivity of produced fluids by determining weight loss of metal specimens exposed in sealed vessels containing the fluids. The sealed vessels are mounted on a wheel or mounting-board and maintained under constant rotation and temperature throughout the exposure period.

The effectiveness of inhibitors is rated by comparing weight losses of similar specimens in inhibited and uninhibited samples of fluid.

Test cells are filled with fresh fluids at the same oil/water ratio as exists in the field samples. (If a sizeable vapor space exists in the sample bottles as received, the fluids in the bottles are purged with inert gas to remove oxygen. The purged samples then are saturated with carbon dioxide, if they are from sweet gas condensate wells, or are saturated with hydrogen sulfide, if they are from sour wells.)

Inhibitors for evaluation are introduced into the test cells at various dosages. "Control" test cells containing no chemical also are used, to establish a base corrosion rate from which relative "percent protection" provided by the chemicals can be computed. All tests normally are run in duplicate.

Weighed metal specimens are inserted and the test cells mounted on a rotating "wheel." The sealed test vessels are maintained under constant temperature and rotation rate throughout the exposure.

Following exposure, the specimens are removed, degreased in acetone or benzene and then scrubbed with soap and water. If corrosion products adhere to the surface, they are removed by dipping the coupons in inhibited technical-grade hydrochloric acid. After cleaning, the coupons are immersed in alcohol, then in acetone or benzene, dried and reweighed.

$$\frac{(\text{wt. loss uninhibited} - \text{wt. loss with inhibitor})}{\text{wt. loss uninhibited}} \times 100 = \text{percent protection}$$

The volume of the test cells was about 200 ml. The exposure period was 24 hours and the wheel rotation was 24 r.p.m.

TABLE III

Type Test: Wheel.
Fluid: 5% NaCl Sour Brine.
Acid Gas: $H_2S$.
Temperature: 100° F.
Time: 24 hrs.

| Chemical | Concentration, p.p.m. | Percent Protection |
|---|---|---|
| Table II, Example 20 | 2 | 36 |
|  | 5 | 53 |
|  | 10 | 86 |
| Table II, Example 21 | 2 | 37 |
|  | 5 | 78 |
|  | 10 | 87 |
| Table II, Example 22 | 2 | 23 |
|  | 5 | 45 |
|  | 10 | 84 |
| Table II, Example 23 | 2 | 18 |
|  | 5 | 45 |
|  | 10 | 82 |
| Table II, Example 24 | 2 | 20 |
|  | 5 | 39 |
|  | 10 | 81 |

TABLE IV

Type Test: Wheel.
Fluid: 5% NaCl Sweet Brine.
Acid Gas: $CO_2$.
Temperature: 100° F.
Time: 24 hrs.

| Corrosion Inhibitor | Concentration, p.p.m. | Percent Protection |
|---|---|---|
| Table II, Example 20 | 5 | 4 |
|  | 10 | 1 |
|  | 20 | 25 |
| Table II, Example 21 | 5 | 3 |
|  | 10 | 21 |
|  | 20 | 57 |
| Table II, Example 22 | 5 | 10 |
|  | 10 | 67 |
|  | 20 | 82 |
| Table II, Example 24 | 5 | 1 |
|  | 10 | 15 |
|  | 20 | 18 |

The results in Table III indicate good corrosion protection at 10 p.p.m. concentration in the NaCl sour brine. On the other hand, substantially equivalent protection was attained in only one instance even at 20 p.p.m. in the NaCl sweet brine (Table IV).

To improve the sweet brine corrosion inhibition efficacy, the corrosion inhibitors as exemplified in the preceding examples are blended with a polyoxyalkylated organic acid having about 8-36 carbons or mixtures of said acids. The organic acid may have 1-2 carboxyl groups, but preferably is a monocarboxylic acid. The acid preferably is polyoxyalkylated with ethylene oxide but may be polyoxyalkylated with both ethylene oxide and propylene oxide in a mol ratio of about 20:1 to 1:1, respectively. The polyoxyalkylation is conducted in the usual manner to provide an average of about 10-25 mols of adducted oxyalkylene groups per mol of the organic acid.

The following is an example of a preferred blend which can be used as a ferrous metal corrosion inhibitor in mildly sour or sweet waters or brines.

EXAMPLE 3

An epichlorohydrin-aliphatic alcohol-amine reaction product prepared substantially as described in Examples 1 and 2 was blended with polyoxyethylated tall oil. The tall oil comprised about 29% rosin acids with the remainder being the fatty acids of tall oil. It was oxyethylated in the presence of a small amount of alkaline catalyst, about 0.05% KOH, until an average of about 15 mols of ethylene oxide per mol of said acid had been adducted.

The foregoing products were blended in a solvent system of water and isopropanol along with a small amount of fatty acid. The blend, broken down as the initial reactant chemicals, had the following composition:

| | Percent |
|---|---|
| Aliphatic primary alcohol mixture, 12-18 carbons | 3.1 |
| Epichlorohydrin | 2.7 |
| Amine bottoms from triethylene diamine (Houdry Amine Residue) | 9.5 |
| Fatty acid (Century CD) | 4.6 |
| Polyoxyethylated tall oil | 41.8 |
| Water | 25.4 |
| Isopropanol | 12.9 |

The above blend contains 61.7% active ingredients. Century CD in Example 3 is a mixture of $C_{16}$ and $C_{18}$ monocarboxylic fatty acids.

An example of a blend without free fatty acid is provided in the following example.

EXAMPLE 4

| | Percent |
|---|---|
| Tridecyl alcohol | 8.2 |
| Epichlorohydrin | 7.8 |
| Amine bottoms from triethylene diamine | 25.8 |
| Polyoxyethylated tall oil | 22.1 |
| Water | 24.5 |
| Isopropanol | 8.6 |
| Methanol | 3.0 |

The following tables show the results of laboratory tests conducted as previously described with corrosion inhibitor compositions corresponding substantially to Examples 3 and 4 in 5% and 10% NaCl sweet brine saturated with $CO_2$ at 100° F. and 160° F., in 5% NaCl brine saturated with $CO_2$ and containing 500 p.p.m. acetic acid, and other test waters. The specimens were polished drill rod coupons.

TABLE V

Test Conditions:
Fluids: 5% NaCl sweet brine saturated with $CO_2$.
Time: 24 hours.
Temperature: 100° F.

| Chemical | Concentration, p.p.m. | Percent Protection |
|---|---|---|
| Example 3 | 5 | 50 |
| Do | 8 | 83 |
| Do | 10 | 81 |
| Do | 15 | 86 |
| Example 4 | 5 | 26 |
| Do | 8 | 24 |
| Do | 10 | 67 |
| Do | 15 | 77 |

NOTE.—Average blank weight-loss=54.5 mg.

TABLE VI

Test Conditions:
Fluids: 10% NaCl sweet brine saturated with $CO_2$.
Time: 24 hours.
Temperature: 100° F.

| Chemical | Concentration, p.p.m. | Percent Protection |
|---|---|---|
| Example 3 | 5 | 27 |
| Do | 8 | 55 |
| Do | 10 | 67 |
| Do | 15 | 72 |
| Do | 20 | 72 |
| Example 4 | 5 | 0 |
| Do | 8 | 3 |
| Do | 10 | 9 |
| Do | 15 | 60 |
| Do | 20 | 58 |

NOTE.—Average blank weight-loss=25.1 mg.

TABLE VII

Test Conditions:
Fluids: 5% NaCl sweet brine saturated with $CO_2$–500 p.p.m. acetic acid.
Time: 24 hours.
Temperature: 100° F.

| Chemical | Concentration, p.p.m. | Percent Protection |
|---|---|---|
| Example 3 | 5 | 76 |
| Do | 8 | 87 |
| Do | 10 | 89 |
| Do | 15 | 91 |
| Do | 20 | 91 |
| Example 4 | 5 | 64 |
| Do | 8 | 84 |
| Do | 10 | 84 |
| Do | 15 | 88 |
| Do | 20 | 89 |

NOTE.—Average blank weight-loss=88.0 mg.

TABLE VIII

Test Conditions:
Fluids: 5% NaCl sweet brine saturated with $CO_2$.
Specimens: Shim Stock Coupons.
Time: 24 hours.
Temperature: 100° F.

| Chemical | Concentration, p.p.m. | Percent Protection |
|---|---|---|
| Example 3 | 5 | 31 |
| Do | 8 | 72 |
| Do | 10 | 73 |
| Do | 20 | 86 |
| Example 4 | 5 | 16 |
| Do | 8 | 15 |
| Do | 10 | 41 |
| Do | 20 | 65 |

NOTE.—Average blank weight-loss=109.7 mg.

TABLE IX

Test Conditions:
Fluids: 5% NaCl sweet brine saturated with $CO_2$.
Time: 24 hours.
Temperature: 160° F.

| Chemical | Concentration, p.p.m. | Percent Protection |
|---|---|---|
| Example 3 | 10 | 23 |
| Do | 15 | 50 |
| Do | 20 | 75 |
| Do | 25 | 80 |
| Do | 30 | 83 |
| Example 4 | 10 | 17 |
| Do | 15 | 21 |
| Do | 20 | 32 |
| Do | 25 | 33 |
| Do | 30 | 46 |

NOTE.—Average blank weight-loss=92.5 mg.

TABLE X

Test Conditions:
Fluids: 10% NaCl sweet brine saturated with $CO_2$.
Time: 24 hours.
Temperature: 160° F.

| Chemical | Concentration, p.p.m. | Percent Protection |
|---|---|---|
| Example 3 | 5 | 0 |
| Do | 8 | 17 |
| Do | 10 | 16 |
| Do | 15 | 48 |
| Do | 20 | 65 |
| Example 4 | 5 | 3 |
| Do | 8 | 3 |
| Do | 10 | 0 |
| Do | 15 | 2 |
| Do | 20 | 17 |

NOTE.—Average blank weight-loss=46.3 mg.

TABLE XI

Test Conditions:
Fluids: 5% NaCl sweet brine saturated with $CO_2$–500 p.p.m. acetic acid.
Time: 24 hours.
Temperature: 160° F.

| Chemical | Concentration, p.p.m. | Percent Protection |
|---|---|---|
| Example 3 | 10 | 56 |
| Do | 15 | 70 |
| Do | 20 | 74 |
| Do | 25 | 81 |
| Do | 30 | 83 |
| Do | 50 | 84 |
| Example 4 | 10 | 11 |
| Do | 15 | 33 |
| Do | 20 | 40 |
| Do | 25 | 62 |
| Do | 30 | 65 |
| Do | 50 | 79 |

NOTE.—Average blank weight-loss=139.0 mg.

TABLE XII

Test Conditions:
Fluids: Tap water saturated with $CO_2$.
Time: 24 hours.
Temperature: 160° F.

| Chemical | Concentration, p.p.m. | Percent Protection |
|---|---|---|
| Example 3 | 5 | 30 |
| Do | 10 | 49 |
| Do | 15 | 60 |
| Do | 30 | 77 |
| Example 4 | 5 | 8 |
| Do | 10 | 23 |
| Do | 15 | 40 |
| Do | 30 | 20 |

NOTE.—Average blank weight-loss=71.7 mg.

TABLE XIII

Test Conditions:
Fluids: 5% NaCl sour brine saturated with $H_2S$.
Time: 24 hours.
Temperature: 160° F.

| Chemical | Concentration, p.p.m. | Percent Protection |
|---|---|---|
| Example 3 | 5 | 43 |
| Do | 10 | 64 |
| Do | 20 | 62 |
| Do | 50 | 55 |
| Example 4 | 5 | 56 |
| Do | 10 | 63 |
| Do | 20 | 62 |
| Do | 50 | 55 |

NOTE.—Average blank weight-loss=20.2 mg.

Solubility characteristics of the blend of Example 3 are shown in the following table.

TABLE XIV.—SOLUBILITY

| Concentration, p.p.m. | Fluid | Clear | Slight Haze | Haze | Insoluble |
|---|---|---|---|---|---|
| 2,500 | 10,000 p.p.m. NaCl brine | X | | | |
| 2,500 | 20,000 p.p.m. NaCl brine | X | | | |
| 2,500 | 30,000 p.p.m. NaCl brine | X | | | |
| 2,500 | 40,000 p.p.m. NaCl brine | | X | | |
| 2,500 | 50,000 p.p.m. NaCl brine | | X | | |
| 2,500 | 60,000 p.p.m. NaCl brine | | X | | |
| 2,500 | 70,000 p.p.m. NaCl brine | | | X | |
| 2,500 | 80,000 p.p.m. NaCl brine | | | X | |
| 2,500 | 90,000 p.p.m. NaCl brine | | | X | |
| 2,500 | 100,000 p.p.m. NaCl brine | | | X | |
| 2,500 | Tap water | X | | | |
| 2,500 | Isopropyl alcohol | X | | | |
| 2,500 | Kerosene | | | | X |

From Tables IX through XII, it will be seen that the inhibitor composition containing free fatty acid (Example 3) inhibits corrosion at the higher temperatures (160° F). Heretofore it has been very difficult to obtain corrosion inhibition with water soluble corrosion inhibitors at the higher temperatures.

Table XIII indicates that the inhibitor compositions had about the same corrosion inhibiting efficacy in extremely sour brines.

In the foregoing examples, Amine AL-1 is a mixture of N-aminoethylpiperazine, N-hydroxyethylpiperazine, N-aminoethylethanolamine, and higher homologs thereof. Polyamine H is a mixture of polyethylenes polyamines having about 6–10 amino groups and is sometimes blended with a lower polyethylene polyamine such as diethylene triamine. Houdry Amine Distillate CNC–10 is an amine mixture recovered as the bottoms from distillation of triethylene diamine in the production of the latter.

The organic acids which are polyoxyalkylated, as aforesaid, preferably are tall oil acids. The generic class of poly-oxyalkylated organic acids, however, embraces organic monocarboxylic and dicarboxylic acids with 8–36 carbons such as naturally occurring acids such as fatty acids derived from hydrolysis of triglycerides, resin acids, such as abietic acid, naturally occurring petroleum acids such as naphthenic acids and carboxy acids produced by the oxidation of petroleum products. While the acids falling within the term "higher molecular weight carboxy acids" differ in physical characteristics, source or origin, and/or structure, they can all be classified in this grouping for the purpose of the instant invention.

Among sources of such acids may be mentioned alicyclic carboxylic acids including straight chain and branched chain aliphatic carboxylic acids, aromatic carboxylic acids, hydroaromatic carboxylic acids and aralkyl carboxylic acids including capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearclic acid, ricinoleyl lactic acid, acetylricinoleic acid, chloracetylricinoleic acid, polyricinoleic acid, ricinostearolic acid, myristic acid, undecylenic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil and other fish oils, teaseed oil, partially or completely hydrogenated animal and vegetable oils, such as those mentioned.

With most of these acids, the polyoxyalkylene group will occur on the carboxyl group, or groups, to provide compounds of the general formulae

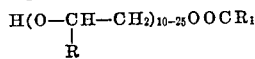

or

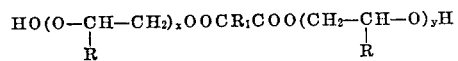

wherein R is all hydrogen or both hydrogen and methyl, $R_1$ is the non-carboxyl portion of the organic acid, and $x+y$ equals 10 to 25. If the organic acid contains one or more hydroxyl groups, it is possible that some oxyalkylation will occur on the hydroxyl groups, also.

The invention is hereby claimed as follows:

1. A corrosion inhibitor composition wherein the active corrosion-inhibiting compounds consist essentially of (A) 90–20% of the reaction product of (a) an organic amine from the group consisting of a monoalkyl amine, a dialkyl amine and a trialkyl amine having 1–12 carbon atoms per alkyl group, an alkylene diamine having 2–12 carbons in the alkylene group, a polyalkylene polyamine having 2–6 carbon alkylene groups and two to ten alkylene groups per molecule, N-aminoethylpiperazine, and quinoline with (b) a compound of the formula

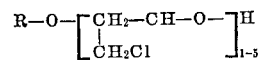

wherein R is a saturated or olefinically unsaturated aliphatic hydrocarbon group having 6–24 carbons, (a) and (b) being reacted at 150–400° F. and at atmospheric pressure up to about 50 p.s.i.g. at a ratio of about one amine group of (a) per chloro group of (b), (B) 10–80% of a polyoxyalkylated organic carboxylic acid having 8–36 carbons and 1–2 carboxyl groups, the oxyalkylene groups being selected from the group consisting of oxyethylene and both oxyethylene and oxypropylene consisting of about 10–25 oxyalkylene groups per mol of said organic acid, the latter acid selected from the group consisting of fatty acids, resin acids, petroleum acids and acids produced by oxidation of petroleum products, and (C) 1–10% of free fatty acids having 8–36 carbon atoms.

2. A corrosion inhibitor as claimed in claim 1 wherein said amine is a trialkyl amine.

3. A corrosion inhibitor as claimed in claim 1 wherein said amine is a dialkyl amine.

4. A corrosion inhibitor as claimed in claim 1 wherein said amine is a monoalkyl amine.

5. A corrosion inhibitor as claimed in claim 1 wherein said polyoxyalkylated organic acid is polyoxyethylated tall oil with about 10–25 oxyethylene groups adducted on each carboxyl group of said tall oil.

6. A corrosion inhibitor as claimed in claim 1 wherein said polyoxyalkylated organic acid is polyoxyethylated tall oil with about 10–25 oxyethylene groups adducted on each carboxyl group of said tall oil and said free fatty acids are aliphatic fatty acids containing about 16–18 carbons.

7. Flooding water for flooding subterranean formations having dissolved therein a ferrous metal-corrosion-inhibiting amount of a composition as claimed in claim 1.

8. Flooding water as claimed in claim 7 wherein said water has hydrogen sulfide dissolved therein.

9. Flooding water as claimed in claim 7 wherein said water is essentially free from dissolved hydrogen sulfide.

10. Flooding water as claimed in claim 7 wherein said polyoxyalkylated organic acid is polyoxyethylated tall oil with about 10–25 oxyethylene groups adducted on each carboxyl group of said tall oil.

11. Flooding water as claimed in claim 7 wherein said polyoxyalkylated organic acid is polyoxyethylated tall oil with about 10–25 oxyethylene groups adducted on each carboxyl group of said tall oil, and said free fatty acids are aliphatic fatty acids containing about 16–18 carbons.

References Cited

UNITED STATES PATENTS

| | | | |
|---|---|---|---|
| 2,598,213 | 5/52 | Blair | 252—8.55 |
| 2,614,982 | 10/52 | Caldwell et al. | 252—8.55 |
| 2,822,330 | 2/58 | Riggs et al. | 252—8.55 |
| 3,017,354 | 1/62 | Riggs | 252—8.55 |
| 3,029,265 | 4/62 | Zech | 252—392 X |
| 3,033,784 | 5/62 | Jones | 252—8.55 |
| 3,047,495 | 7/62 | Kirkpatrick et al. | 252—8.55 |

HERBERT B. GUYNN, Primary Examiner.

U.S. Cl. X.R.

252—392, 396; 21—2.7; 260—584, 268, 289